Oct. 19, 1965     R. W. FREYTAG ETAL     3,213,359

NON-INDUCTIVE HALL-CELL MAGNETOMETER

Filed Jan. 15, 1963

INVENTORS.
RICHARD W. FREYTAG
JOSEPH W. GRATIAN

BY

*T. L. Styner*

ATTORNEY 3,213,359
NON-INDUCTIVE HALL-CELL MAGNETOMETER
Richard W. Freytag, Pittsford, and Joseph W. Gratian, Rochester, N.Y., assignors to General Dynamics Corporation, Rochester, N.Y., a corporation of Delaware
Filed Jan. 15, 1963, Ser. No. 251,661
4 Claims. (Cl. 324—45)

This invention relates to magnetometers of the Hall-cell type and is particularly directed to means for minimizing the external magnetic field produced by the operating current of the cell.

The Hall-effect device, or Hall-cell, comprises a wafer or flat crystal of semiconductor material to one axis of which is applied a direct current voltage and to another axis of which is applied a magnetic field and from the third axis of which is obtained a voltage that is a function of the direct current and the magnetic field. Such a device may be employed for measuring unknown magnetic fields by placing the plane of the wafer perpendicular to the direction of the magnetic lines of force of the field. Unfortunately, the applied direct current may be considerable and the magnetic field produced by the direct current flowing in the wafer may be large compared to the magnetic field to be measured. If, for example, the magnetization of recorded tapes or thin films is to be measured, the direct current flowing in the Hall-cell may alter, or even switch the polarity of, the field and render the Hall voltage unreliable as an indicator of the unknown field.

An object of this invention is to provide an improved magnetometer which has a low external field and will produce a reliable indication of small magnetic fields.

The object of this invention is attained by, in effect, folding the direct current path through the cell so that the direct current flows in opposite directions through the cell to effectively neutralize the magnetic field produced by the current.

Other objects and features of this invention will become apparent to those skilled in the art by referring to the specific embodiments described in the following specification and shown in the accompanying drawings in which.

Figure 1:
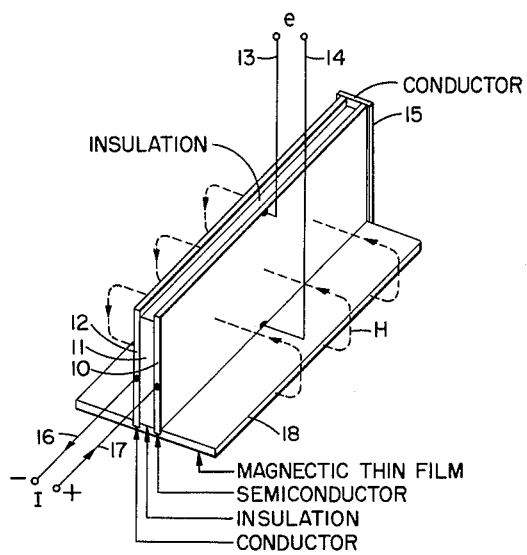
FIG. 1 is a perspective view of one Hall-cell constructed according to this invention.

In FIG. 1, the Hall-cell which will generate the Hall voltage $e$ comprises a semiconductor wafer 10 applied to one face of the insulating sheet 11. To the other face of the sheet is attached the sheet-like conductor 12 comparable in size and shape with the semiconductor wafer. While many semiconductor materials exhibit the Hall-effect, indium arsenide (InAs) or indium antimonide (InSb) are preferred, because of their electrical properties. Because these materials are brittle and are difficult to machine or lap to the requisite thinness without breakage, it is preferred that the semiconductor be laid down upon its insulating support base by such techniques as vacuum deposition. When thus deposited, the outer face of the semiconductor wafer may be lapped or polished, if desired.

In operation, an excitation current flowing along one axis of the semiconductor body 10 will produce a Hall voltage $e$ across the second axis of the body which is a function of the magnitude of the field H in the direction of the third axis of the body. Unfortunately, the field produced by the excitation current may be quite large compared to the magnetic field to be measured. According to an important feature of this invention, means are provided for directing the excitation current along a path closely spaced to the first axis to neutralize the field caused by the excitation current. For effective neutralization of the external field, the conductive path for the current in its two directions should be substantially coextensive in size and shape.

According to FIG. 1, the conductive sheet 12 is disposed in close-spaced parallel relation with wafer 10. To the opposite side of the insulating sheet 11 is applied, as with an adhesive, the metal sheet or foil 12. In FIG. 1, lead wires 13 and 14 are connected by spots of solder to top and bottom edges of the semiconductor wafer. The remote end edges of the wafer 10 and sheet 12 are electrically connected. Connection is preferably made throughout the length of the end edges and, conveniently, is effected by a short metal ribbon 15 soldered in place. Direct current, I, enters and leaves the cell through conductors 16 and 17 which are connected to adjacent end edges of the wafer and sheet. Now, since the direct current, I, flows in opposite directions in wafers 10 and 12 and since the two wafers are closely spaced, the external magnetic field produced by current I is negligible.

In operation, the cell is placed in the magnetic field H to be measured. Such a field might, for example, be the field produced by the magnetized surface of a recording tape, a section of which is shown at 18 in FIG. 1. The cell is oriented with the face of the wafer perpendicular to the direction of the magnetic lines of force. For a given current I flowing lengthwise through the wafer, the Hall voltage $e$ at the side edges is a function of the field H. Since the magnetic field produced by the current I is neutralized, the proportionality of $e$ to H holds even for minute values of H.

Figure 2:
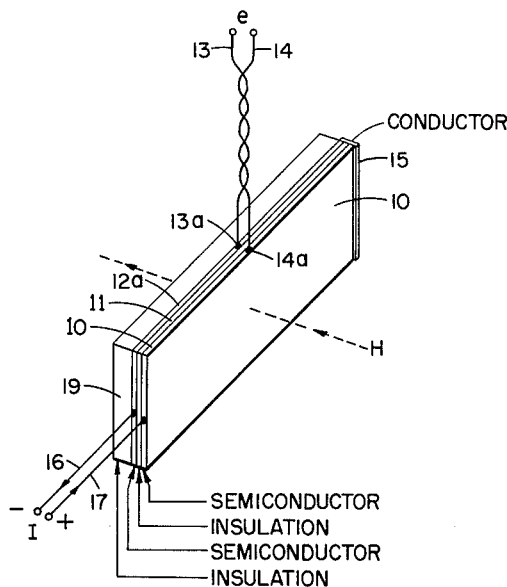
FIG. 2 is a perspective view of an alternative embodiment of this invention.

According to the embodiment of this invention shown in FIG. 2, the output leads 13 and 14 may both be connected to the upper side edges of the cell. Here, wafer 12a as well as wafer 10 is of semiconductor material selected for good Hall characteristics. The two wafers are separated by the insulating layer 11 and are electrically connected at the remote end by the conductor 15, and the direct current leads 16 and 17 are connected to the opposite end edges of the two wafers. The three-layer sandwich is preferably applied to and supported by the block 19 of insulating material. The Hall voltage appears between intermediate points on the upper side edges of the wafers 10 and 12, attachment of output leads being made at points 13a and 14a, as with solder. Since these two points are closely spaced, the lead wires 13 and 14 may be twisted or closely spaced to minimize inductive coupling with undesired external fields, thus further improving the signal-to-noise ratio.

Figure 3:
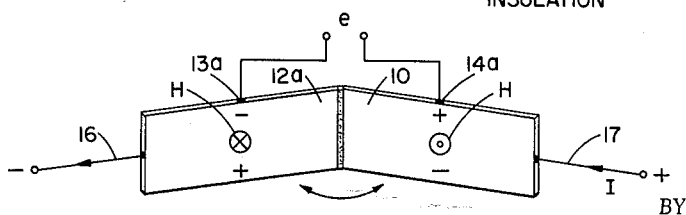
FIG. 3 is an expanded view of the semiconductor wafer of the cell of this invention, showing the polarities of principal currents and fields.

The reason the Hall voltage $e$ can be obtained at adjacent points on the upper edges of the wafers may be seen in FIG. 3 where the folded wafers are laid out in plan view. Since current, I, flows in one direction, say, from right to left, through the two wafers, and since the polarity of the magnetic field in the two wafers is reversed with respect to I, the Hall voltage polarities across the side edges of one wafer is reversed with respect to the Hall voltage across the side edges of the other wafer. Hence, when the two wafers are folded together, the Hall voltage $e$ appears at closely adjacent points on one edge of the cell. It follows the output leads can be well removed or shielded from the field to be measured.

In manufacture, it is preferred that the block 19 of fired ceramic or other insulating material be smoothed on one side and then covered with indium arsenide or indium antimonide which is deposited to the desired thickness for wafer 12. The soldered connections for the leads 16 and 13a at the end and side edges are then made, after which the hardened wafer is milled. The insulating layer 11 of silica is then applied followed by the application of the second semiconductor layer 10. The remaining wire connections 17 and 14a are made to the end and side edges of wafer 10 and finally the conductor 15 is applied. Conductor 15 conveniently may comprise a strip of solder laid across the right-hand end edge of the assembly to complete the electrical connection between the two wafers. The thicknesses of the layers 10, 11 and 12 are easily adjusted to the thicknesses required for good electrical and mechanical properties and may each be of the order of .001 inch. The edges of the deposited layers should be trimmed or milled to remove any short circuits.

Many modifications may be made in the mode of manufacture and in structural details without departing from the invention described here and defined in the appended claims.

What is claimed is:

1. A magnetic sensing device for sensing minute magnetic fields, said sensing device comprising a wafer of semiconductor material having Hall-effect characteristics when direct current is directed along one planar axis of the wafer to generate a Hall-voltage on the other planar axis of the wafer which voltage is a function of the magnetic field normal to the plane of the wafer, means for minimizing the external magnetic field produced by said direct current along said one planar axis comprising a conductor sheet in close spaced parallel relationship with said wafer, means for connecting said wafer and sheet in series with each other so that current of equal amplitude flows in opposite direction through said wafer and sheet.

2. The invention as set forth in claim 1 including a sheet of insulating material separating said conductor sheet and said semiconductor material wafer.

3. The invention as set forth in claim 2 including an adhesive attaching said conductor sheet to said insulating material sheet.

4. The invention as set forth in claim 2 wherein said wafer is deposited upon said insulating sheet.

References Cited by the Examiner

UNITED STATES PATENTS 2,855,549  10/58  Kuhrt _____ 324—45

FOREIGN PATENTS 1,043,500  11/58  Germany.

RICHARD B. WILKINSON, *Primary Examiner.*